(No Model.) 2 Sheets—Sheet 1.

E. HOHNBAUM.
LEVEL.

No. 555,771. Patented Mar. 3, 1896.

Witnesses:
G. N. Rea,
Thos. A. Guese

Inventor:
Ernst Hohnbaum,
By James L. Norris.
Atty.

(No Model.)　　　　　　E. HOHNBAUM.　　　　2 Sheets—Sheet 2.
　　　　　　　　　　　　　　LEVEL.

No. 555,771.　　　　　　　　　　Patented Mar. 3, 1896.

Witnesses:
G. W. Rea,
Thos. A. Green

Inventor:
Ernst Hohnbaum,
By James L. Norris.
Atty.

United States Patent Office.

ERNST HOHNBAUM, OF RODACH, GERMANY.

LEVEL.

SPECIFICATION forming part of Letters Patent No. 555,771, dated March 3, 1896.

Application filed April 24, 1894. Serial No. 508,828. (No model.)

*To all whom it may concern:*

Be it known that I, ERNST HOHNBAUM, a subject of the Duke of Saxe-Coburg-Gotha, residing at Rodach, in the Duchy of Saxe-Coburg-Gotha, German Empire, have invented new and useful Improvements in Levels, of which the following is a specification.

This invention relates to bubble or spirit levels for leveling purposes or for indicating angles of inclination of any desired magnitude. To accomplish this object the invention consists in the features of construction and the combination or arrangement of parts hereinafter described and claimed, reference being made to the accompanying drawings, in which—

Figure 1:
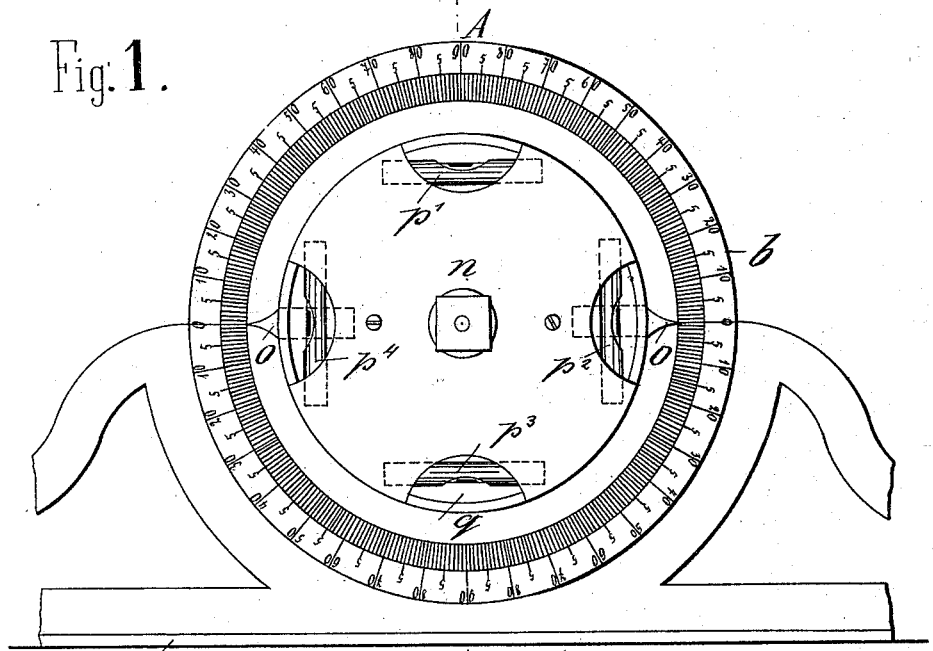
Figure 2:
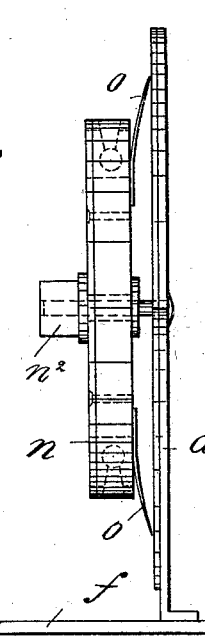
Figure 3:
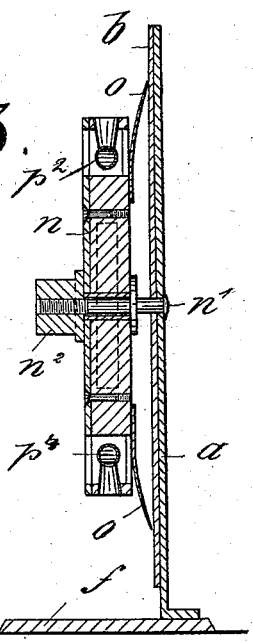
Figure 4:
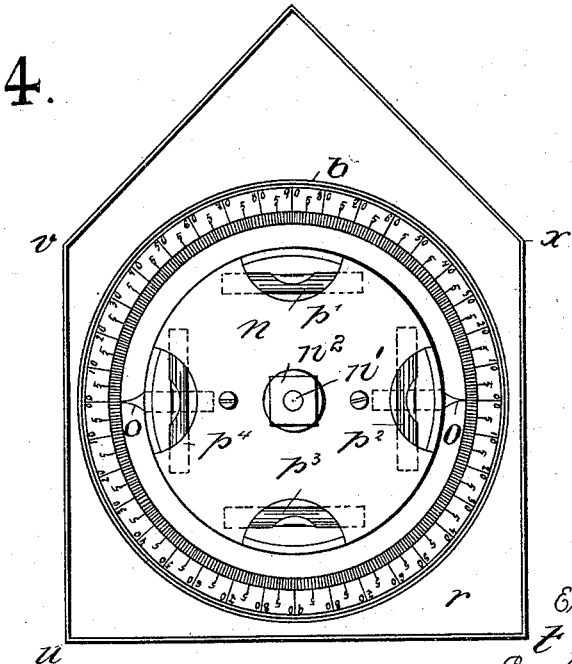

Figure 1 is a front elevation of my improved level, end portions of the straight-edge being broken away. Fig. 2 is an end elevation of the same. Fig. 3 is a vertical sectional view taken on the line A B, Fig. 1; and Fig. 4 is a front elevation showing a modification of the invention.

In order to enable those skilled in the art to make and use my invention, I will now describe the same in detail, referring to the drawings, wherein—

The letter $f$ indicates a straight edge, from which arises a perpendicular frame $a$ in the form of a flat plate. The perpendicular frame or plate $a$ is provided at its front side with a ring $b$, having a graduated circle divided into three hundred and sixty degrees. The frame or plate $a$ is provided at its center with a shaft or spindle $n'$, on which the central portion of a case $n$ is loosely mounted, so that the case can be rotated. The case is provided at diametrically-opposite points with projecting index-fingers or pointers $o$, to co-operate with the graduations on the face of the ring $b$. The case is chambered to receive four bubble or spirit levels $p'$, $p^2$, $p^3$, and $p^4$, and the front side of the case is cut away or provided with openings or recesses, as at $q$, to render the bubbles of the levels visible. The bubble or spirit levels $p'$ and $p^3$ are arranged parallel with each other and in planes at right angles to the bubble or spirit levels $p^2$ and $p^4$. The case $n$ is susceptible of being rotated on the shaft or spindle $n'$, and it can be fixed in any position of adjustment through the medium of a nut $n^2$ screwed on the outer end of the shaft or spindle $n'$ and bearing against the front face of the case $n$, so that if the nut be tightened on the shaft or spindle the case $n$ will be held against rotation, and its index-hands or pointers $o$ will be held fixed in relation relatively to some of the graduations on the face of the ring $b$. If the index-hands or pointers $o$ are placed at zero and the straight-edge $f$ is horizontal, as in Fig. 1, the bubble of the spirit-level $p'$ will lie and be visible at the center of such level. If the device be inverted or be turned upside down from the position shown in Fig. 1, the bubble of the spirit-level $p^3$ will lie and be visible at the center of such level, and this result is attained without readjusting any of the parts. If the pointers $o$ are placed, for instance, at ninety degrees and the straight-edge $f$ is vertical, the bubble of either the spirit-level $p^2$ or $p^4$ will lie and be visible at the center of such level.

By the means described and shown all desired measurement can be made horizontally or vertically without altering the positions of the bubble levels after the adjustment above set forth is effected.

In the modification, Fig. 4, a frame $r$, corresponding to the plate $a$, is employed, and the edges of this plate form straight edges, as at $t\, u$, $t\, x$, and $u\, v$, while the upper end of the plate is formed at two angles of inclination, as at $v\, w$ and $w\, x$. The plate or frame $r$ carries a shaft or spindle $n'$, on which the case $n$ is mounted, and is adapted to be held in a fixed position through the medium of the screw-nut $n^2$.

The case $n$, graduated ring $b$, index-hands or pointers $o$, and the bubble or spirit levels $p'$, $p^2$, $p^3$, and $p^4$ are constructed the same as described with reference to Figs. 1, 2 and 3.

The construction shown in Fig. 4 renders it possible to measure angles of inclination of, say, thirty or forty-five degrees without alteration of the level.

It will be observed that in my construction a series of bubble-levels are arranged in a circular path or are concentric with the center of the case, and consequently the extent of movement of the rotatable case necessary to bring one of the bubble-levels into its operative position when the device is used as a clinometer is materially diminished.

Having thus described my invention, what I claim is—

1. The combination with a frame or plate provided with a ring graduated in a circle, and a shaft or spindle extending outward from the frame or plate, of a case rotatable on the shaft or spindle and provided with a plurality of spirit or bubble levels and radially-projecting index-hands or pointers, and a device for holding the case in a fixed position on the shaft or spindle, substantially as described.

2. The combination with a frame or plate provided with a ring graduated in a circle, and a shaft or spindle extending outward from the frame or plate, of a case rotatably mounted on the shaft or spindle and having chambers in which a plurality of bubble or spirit levels are located, and openings or recesses through which the bubbles are visible, index-hands or pointers extending from the periphery of the case, and a screw-nut mounted on the shaft or spindle for clamping the case in a fixed position, substantially as described.

3. The combination of a straight-edge provided with a perpendicular frame or plate having a ring graduated in a circle, a shaft or spindle extending outward from the frame or plate, a case rotatably mounted on the shaft or spindle and provided with a plurality of bubble or spirit levels, and two index-hands or pointers arranged at diametrically-opposite points of the case, and a screw-nut mounted on the shaft or spindle for clamping the case in a fixed position, substantially as described.

4. The combination with a straight-edge having a perpendicular frame or plate provided with a ring graduated in a circle, of a rotatable case journaled in front of the frame or plate and provided with a plurality of bubble or spirit levels and two index-hands or pointers arranged at diametrically-opposite points, and means for securing the case in a fixed position, substantially as and for the purpose described.

In testimony whereof I have hereunto set my hand in presence of two subscribing witnesses.

ERNST HOHNBAUM.

Witnesses:
D. J. PARTELLO,
ALVIN FLORSCHULTZ.